(12) United States Patent
Fuhr

(10) Patent No.: US 12,108,908 B1
(45) Date of Patent: Oct. 8, 2024

(54) TWO LEVEL BAKING PAN

(71) Applicant: Lindsey M. Fuhr, Gainesville, FL (US)

(72) Inventor: Lindsey M. Fuhr, Gainesville, FL (US)

(*) Notice: Subject to any disclaimer, the term of this patent is extended or adjusted under 35 U.S.C. 154(b) by 0 days.

(21) Appl. No.: 18/378,265

(22) Filed: Oct. 10, 2023

(51) Int. Cl.
*A47J 37/01* (2006.01)

(52) U.S. Cl.
CPC ..................... *A47J 37/01* (2013.01)

(58) Field of Classification Search
CPC ........ A47J 37/01; A47J 36/025; A47J 36/027; A47J 36/16; A21B 3/15; A21B 3/13
USPC ... 220/573.1, 912, 573.4, 23.87, 23.88, 627, 220/636; 206/557
See application file for complete search history.

(56) References Cited

U.S. PATENT DOCUMENTS

| | | | | |
|---|---|---|---|---|
| 346,808 A | * | 8/1886 | Doebler | A21B 3/13 47/73 |
| 4,373,511 A | * | 2/1983 | Miles | A47J 27/04 126/369 |
| 4,529,089 A | * | 7/1985 | Gasbarra | B65D 81/3438 426/107 |
| 2005/0263013 A1 | * | 12/2005 | Siegel | A21B 3/15 99/426 |

FOREIGN PATENT DOCUMENTS

DE     29905157    *   6/1999         A21B 3/15

* cited by examiner

*Primary Examiner* — Elizabeth J Volz
(74) *Attorney, Agent, or Firm* — Harness, Dickey & Pierce, P.L.C.; Anthony G. Fussner

(57) ABSTRACT

A baking pan has a generally open top hollow body shape. The edges of the open top define a plane. The bottom of the baking pan has a first bottom portion at a first depth from the open top and parallel to the plane, a second bottom portion at a second depth from the open top different from the first depth and parallel to the plane, and a transition portion merging the first bottom portion with the second bottom portion. The bottom portions may be flat. The transition portion may be straight or curved and may be vertical or inclined.

20 Claims, 4 Drawing Sheets

TWO LEVEL BAKING PAN

BACKGROUND OF THE DISCLOSURE

Field of the Disclosure

The present disclosure relates to a baking dishes and more particularly to a baking pan for baking brownies achieving different levels of doneness in the same pan.

State of the Art

Baking pans for baking cake, bread, banana bread, pie or other baked goods such as brownies are usually generally rectangular metal or glass pans having a depth of between 1 and 2 inches. In the case of brownies, for example, the baker simply pours brownie mix into the pan and then bakes in an oven at 350 degrees for 15-20 minutes or until the desired level of doneness is achieved. This time and temperature likely changes depending on the material being baked (e.g. cake, brownie, banana bread.)

However, some people like chewy soft brownies and other people like harder, more cakelike brownies. The difference between chewy and cakelike brownies generally is determined by the amount of time the brownies are baked in an oven. To achieve different levels of doneness, this then requires the baker to use two separate pans in the oven for different amounts of time. This can lead to a waste of the brownies that are not sufficiently done or a waste of those that appear to be overdone. What is needed is a single baking dish that can accommodate baking for both preferences of different people at the same time.

SUMMARY OF THE DISCLOSURE

A baking pan in accordance with the present disclosure addresses the above need. One exemplary baking pan in accordance with the present disclosure is preferably an open top box shaped body having an upper edge defining a plane and having a bottom of the body spaced from the upper edge having a first flat portion at a first depth from the upper edge. The bottom has a first flat portion parallel to the plane, and a second flat bottom portion at a second depth from the upper edge. The second flat portion is also parallel to the plane. The baking pan preferably further includes a transition portion between the first flat bottom portion and the second flat bottom portion. This transition portion may be an inclined surface. Alternatively, the transition portion may be vertical.

The baking pan typically has a depth of between 1 and 3 inches and there is a depth difference between the first bottom portion and the second bottom portion between ¼ and ½ inches. These bottom portions may be flat. In one exemplary embodiment a length of the first flat bottom portion is preferably equal to a length of the second flat bottom portion. Alternatively, the length of the first flat bottom portion may be different than a length of the second flat portion.

An exemplary embodiment of a baking pan may alternatively be viewed as an open top hollow body having an upper edge defining a plane. The pan includes a bottom of the open top hollow body having a first flat bottom portion parallel to the plane and spaced a first distance from the upper edge and a second flat bottom portion parallel to the plane and spaced a second distance from the upper edge, and a transition portion between the first and second flat bottom portions. This transition portion may be inclined or it may be vertical. Preferably the baking pan has four side walls. These side walls may be vertical or they may be sloped, and other closed open topped shapes are also envisioned. Preferably at least two opposite side walls each terminate in a bottom straight edge so the pan lies level when placed on a level oven rack.

Alternatively a baking pan in accordance with the present disclosure may be viewed as an open top box shaped body having a closed upper edge defining a plane and a flat bottom parallel to the plane; and may include a flat insert shaped to fit onto the flat bottom within the open top box shaped body and defining within the open top box shaped body a first portion of the bottom adjacent the insert and a second portion spaced from the first portion, wherein the second portion is the upper surface of the insert. The flat insert preferably has a tapered edge for transitioning to the flat bottom of the body.

DETAILED DESCRIPTION

Figure 1:
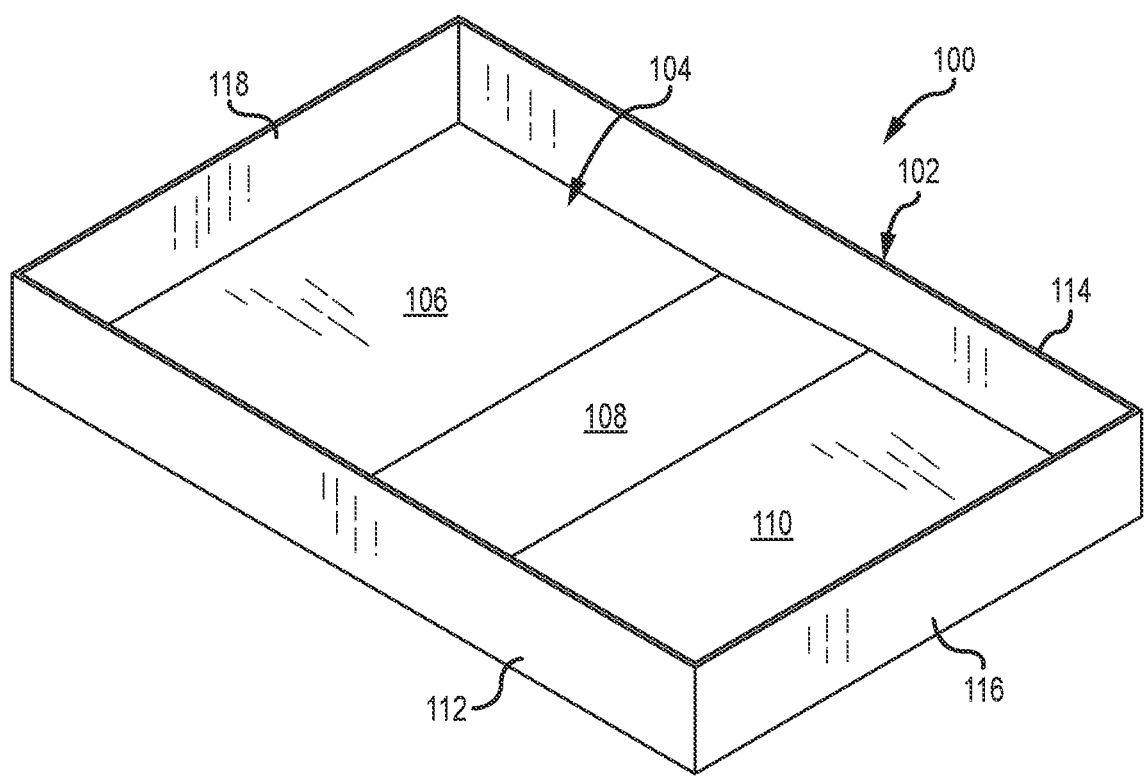
FIG. 1 is a perspective view of a first embodiment of a baking pan in accordance with the present disclosure.

An exemplary first embodiment of a baking pan 100 in accordance with the present disclosure is shown in FIGS. 1-4. This example baking pan 100 is an open top box shaped pan that has a rectangular peripheral top edge 102 defining a plane and preferably has a side wall height of about 1¾ inches, a length of about 13 inches and a width of about 9 inches. This baking pan 100 has a bottom 104 configured with a flat first bottom portion 106 at a depth of 1¾ inches from the top edge 102 of the pan 100, an inclined transition portion 108, and a flat second bottom portion 110 raised about ¼ inch from the flat first bottom portion 106. The transition portion 108 preferably smoothly merges the first flat bottom portion 106 with the second flat bottom portion 110 and preferably has a width of 1-3 inches.

Figure 2:
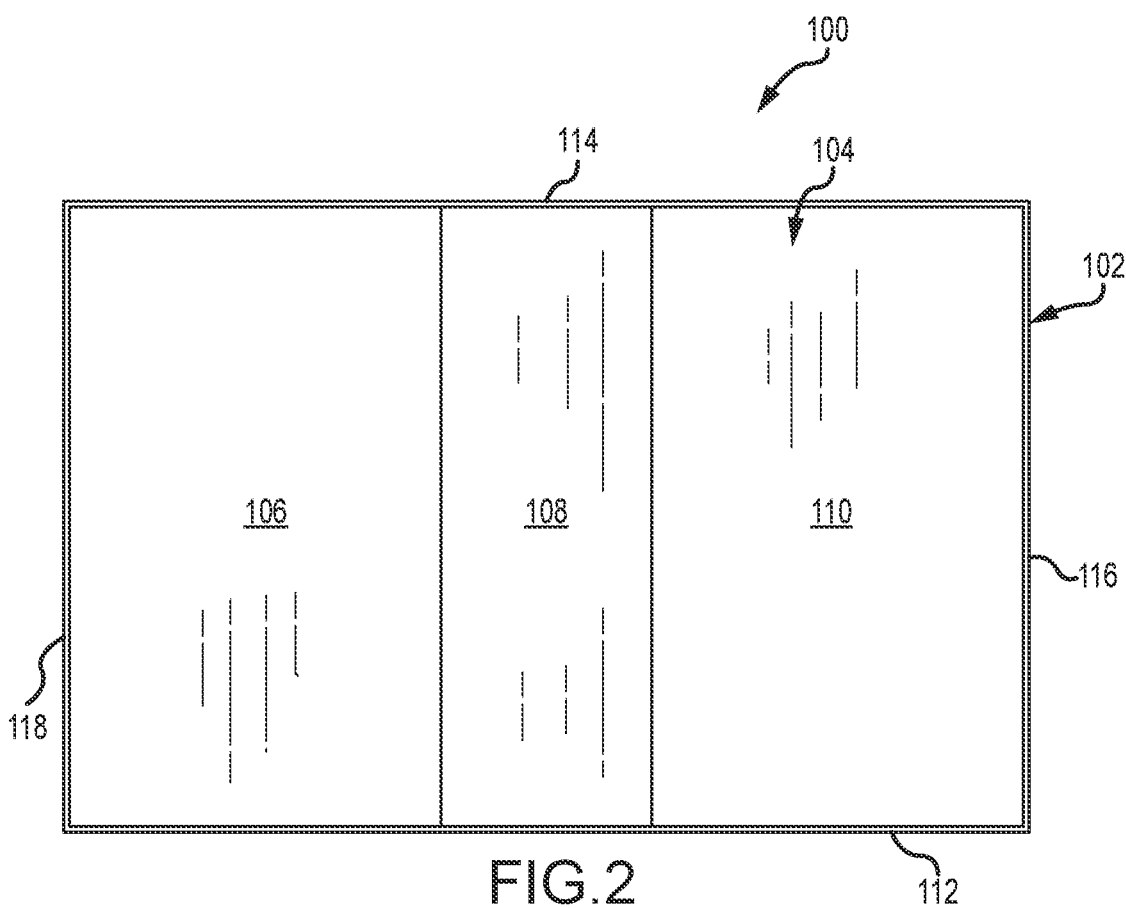
FIG. 2 is a plan view of the baking pan shown in FIG. 1.

A plan view of the exemplary baking pan 100 is shown in FIG. 2. The pan 100 has a first side wall 112, a second side wall 114, a first end wall 116 and a second end wall 118. Each of the side walls 112, 114 and end walls 116, 118 join the bottom 104. The upper edges of the side walls and end walls together form the peripheral top edge 102. The bottom edges 120 of at least the side walls 112, 114 and end wall 118 lie in a plane parallel to the top edge 102 of the pan 100. The bottom edge of the end wall 116 may be ¼ inch above the bottom edges of the side walls 112, 114 as is evident in the cross-sectional view shown in FIG. 4. Alternatively the second bottom portion 110 of the bottom 104 may butted against the first end wall 116 during fabrication such that the bottom edge of the first end wall 116 matches the bottom edge of the first and second side walls 112, 114.

Figure 3:
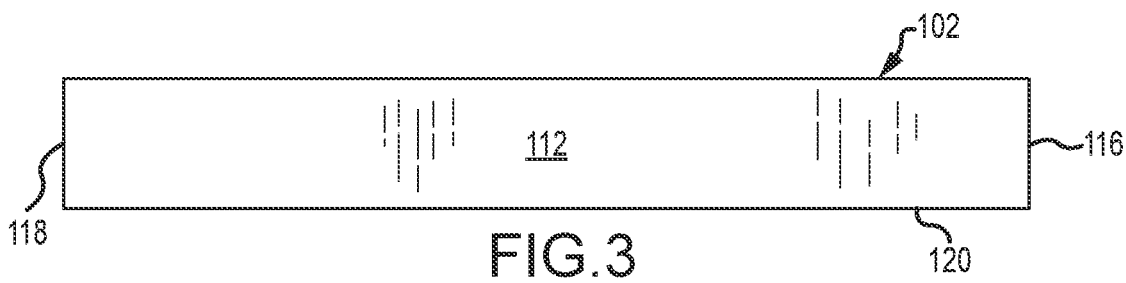
FIG. 3 is a side view of the baking pan shown in FIG. 1.
Figure 4:
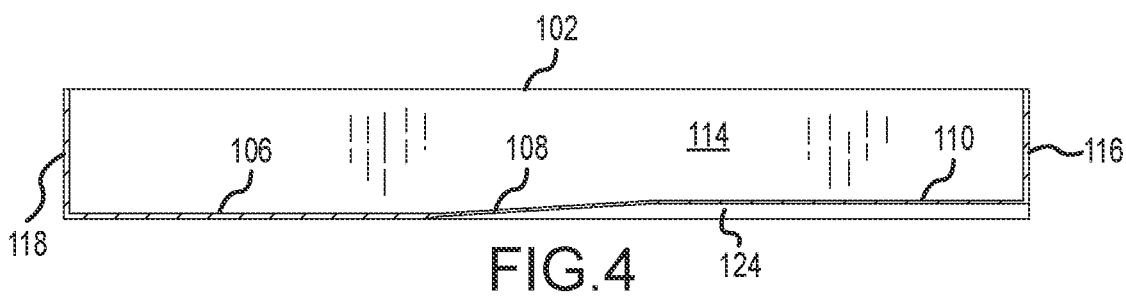
FIG. 4 is a cross-sectional view of the baking pan taken along line 4-4 in FIG. 1.
Figure 5:
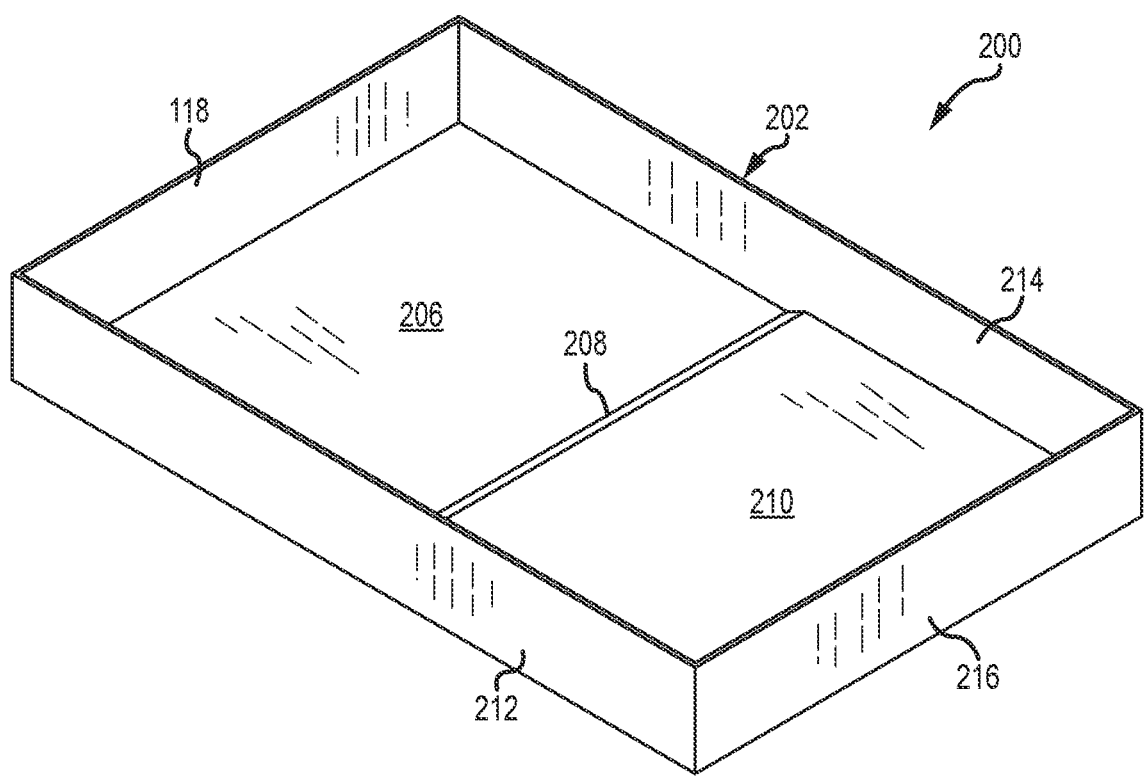
FIG. 5 is a perspective view of a second embodiment of a baking pan in accordance with the present disclosure.

A side view of the baking pan 100 is shown in FIG. 3. The first side wall 112 has a straight rectangular shape with the bottom 104 parallel to the top edge 102 of the pan 100. A sectional view of the pan 100 is shown in FIG. 4. In this sectional view the bottom edge of the first end wall 116 terminates ¼ inch above the bottom edge 120 of the side wall 114 as it forms part of the bottom portion 110 of the pan 100.

An exemplary second embodiment of a baking pan 200 in accordance with the present disclosure is shown in FIGS. 5-8. This example baking pan 200 is an open top box shaped pan that has a rectangular peripheral top edge 202 defining a plane and preferably has a side wall height of about 1¾ inches, a length of about 13 inches and a width of about 9 inches. This baking pan 200 has a bottom 204 configured with a flat first bottom portion 206 at a depth of 1¾ inches from the top edge 202 of the pan 200, a short inclined transition portion 208, and a flat second bottom portion 210 raised about ¼ inch from the flat first bottom portion 206. The transition portion preferably smoothly merges the first flat bottom portion 206 with the second flat bottom portion 208 and preferably has a width of ½-¾ inches.

Figure 6:
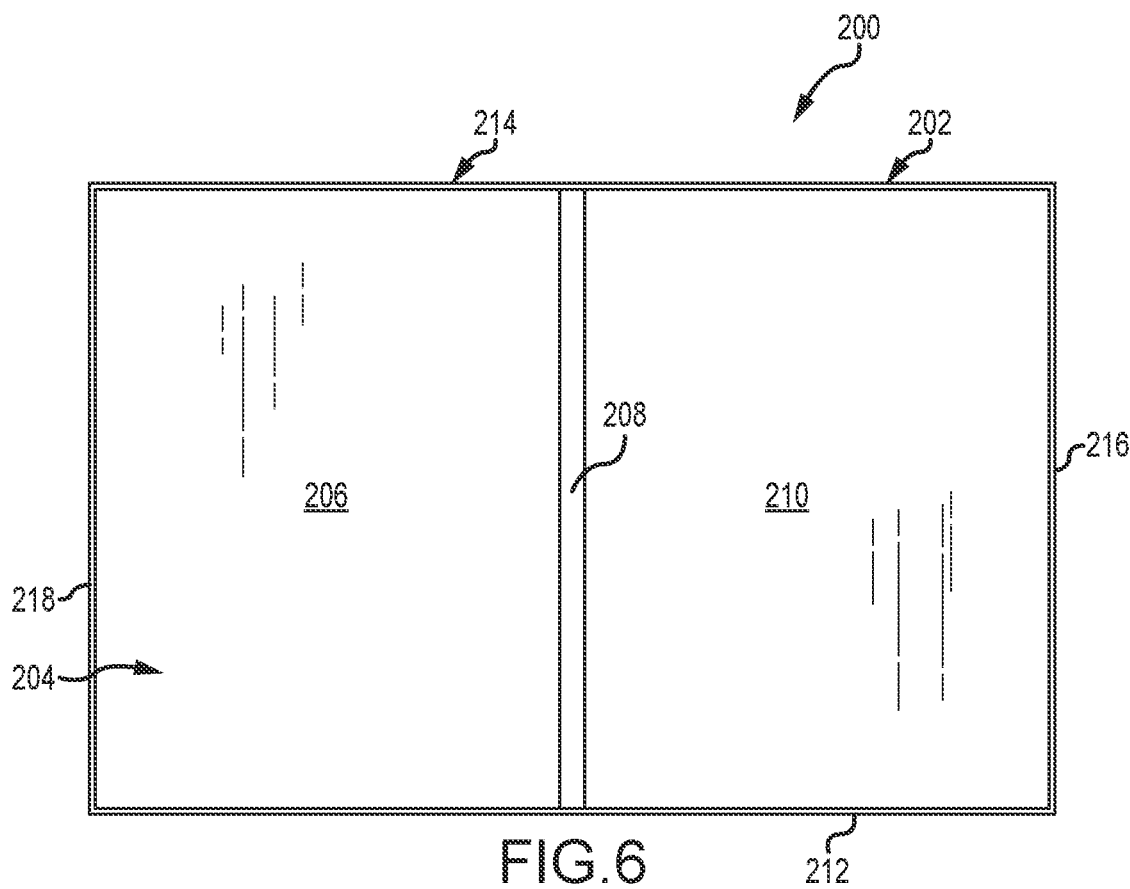
FIG. 6 is a plan view of the second embodiment shown in FIG. 5.

A plan view of the exemplary baking pan 200 is shown in FIG. 6. The pan 200 has a first side wall 212, a second side wall 214, a first end wall 216 and a second end wall 218. Each of the side walls 212, 214 and end walls 216, 218 join the bottom 204. The upper edges of the side walls and end walls together form the peripheral top edge 202. The bottom edges 220 of at least the side walls 212, 214 and end wall 218 lie in a plane parallel to the top edge 202 of the pan 200. The bottom edge of the end wall 216 may lie above the bottom edges of the side walls 212, 214 as is evident in the cross-sectional view shown in FIG. 8. Alternatively, the second bottom portion 210 of the bottom 204 may butted against the first end wall 216 during fabrication such that the bottom edge of the first end wall 216 matches the bottom edge of the first and second side walls 212, 214.

Figure 7:
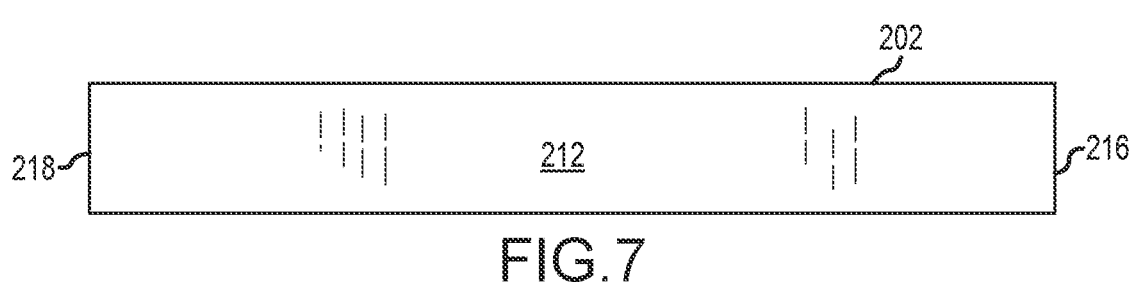
FIG. 7 is a side view of the second embodiment shown in FIG. 5.
Figure 8:
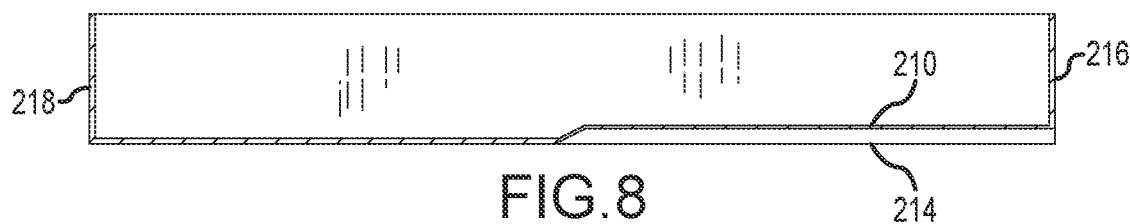
FIG. 8 is a sectional view taken along line 8-8 shown in FIG. 5.

A side view of the baking pan 200 is shown in FIG. 7. The first side wall 212 has a straight rectangular shape with the bottom 204 parallel to the top edge 202 of the pan 200. A sectional view of the pan 200 is shown in FIG. 8. In this sectional view the bottom edge of the first end wall 216 terminates about ¼ inch above the bottom edge 220 of the side wall 214 as it forms part of the bottom portion 210 of the pan 200.

In each of these embodiments 100 and 200 the bottom edges of the sides and second end wall lie in a common plane parallel to the top edge 102, 202 such that when the baking pan 100, 200 is placed in an oven on a level rack the brownie dough or other material in the pan will lie horizontal on the oven rack. When properly cooked, the resulting brownies will have a different consistency depending on the depth of the brownie dough in the pan from the top edge 102, 202.

The two level baking pan in accordance with the present disclosure may alternatively have a step change between the bottom portions 106, 206 and 110, 210 such that the transition portion 108, 208 is vertical. The bottom may be integrally formed with the side and end walls or may be preferably bonded thereto in such a manner that no leakage between the bottom and side and end walls can occur during cooking. At the same time, the opposite lateral side walls of the baking pan preferably are configured to terminate at a straight bottom edge so that the pan, when placed in or on an oven rack will lie in a plane parallel to the oven rack.

A still further embodiment in accordance with the present disclosure may include a flat bottom pan with a separable insert configured to sit on the bottom of the pan. This separable insert raises the effective bottom of the pan about ¼ to ½ inch above the normal bottom of the pan. This configuration would give the pan a two depth configuration, with one portion having a depth being 1¾ inch and the other portion having a depth being 1½ inches. In this configuration the separable insert should have a high heat transmissive characteristic so that the oven heat can uniformly be transmitted through the dough during cooking.

The shape of the open top baking pan in accordance with this disclosure need not have a rectangular shape as shown. Any closed open top pan shape is envisioned as being within the scope of this disclosure. For example, the pan may have a generally circular or oblong shape. Alternatively, the pan may have an exterior shape in the form of an animal, flower, geometric shape or any other recognizable object shape.

The transition between the first bottom portion and the second bottom portion may be a vertical step change or may be curved or gradual. Furthermore, the transition need not be in a straight line across the bottom of the pan as is shown. The transition may be curved or follow any defined path.

The pan of the invention may be made of any material, such as a metal, glass, ceramic or a high temperature plastic that can withstand a temperature of at least 100 degrees Celsius. Baking pans for baking cake, bread, banana bread, pie or other baked goods such as brownies are usually generally rectangular metal or glass pans typically having a depth of between 1 and 4 inches. Furthermore, the height difference between the first bottom portion and the second bottom portion may be other than ¼ inch. It really depends on the amount of doneness desired by the baker given the particular content of ingredients within the pan being baked. A ¼ inch difference inch is merely exemplary and is effective in the case of a typical brownie mix. Finally, the description of brownies is merely exemplary and is particularly effective when baked goods having a variety of doneness is desired. Accordingly, all such alternatives, variations and modifications are intended to be encompassed within the scope of and as defined by the following claims.

What is claimed is:

1. A baking pan for baking a product having two different levels of doneness, the baking pan comprising:
    an open top box shaped body having an upper edge defining a plane substantially parallel to an upper surface of a material placed into the open top box shaped body;
    a bottom of the body spaced from the upper edge having a first bottom portion at a first depth from the upper edge, wherein the first bottom portion is parallel to the plane and extends fully across a width of the bottom of the body, and a second bottom portion at a second depth from the upper edge that is different than the first depth of the first bottom portion from the upper edge, the first and second bottom portions being unobstructed from each other, wherein the second bottom portion extends fully across the width of the bottom of the body and is parallel to the plane;
    wherein the baking pan is configured such that when the material is placed into the open top box shaped body, the material has a first depth from the upper surface of the material over the first bottom portion and a second depth from the upper surface of the material over the second bottom portion different from the first depth of the material, and such that after baking the material in the baking pan, the material has different levels of doneness due to the difference in the first depth of the material from the upper surface of the material over the first bottom portion and the second depth of the material from the upper surface of the material over the second bottom portion.

2. The baking pan according to claim 1 further comprising a transition portion between the first bottom portion and the second bottom portion.

3. The baking pan according to claim 2 wherein the transition portion is an inclined surface.

4. The baking pan according to claim 2 wherein the transition portion is vertical.

5. The baking pan according to claim 1 wherein a depth difference between the first depth and the second depth is between ¼ and ⅜ inches.

6. The baking pan according to claim 1 wherein a length of the first bottom portion is equal to or different than a length of the second bottom portion.

7. The baking pan according to claim 1 wherein the open top box shaped body defines a single compartment for placement of the material therein, the single compartment including the first bottom portion and the second bottom portion.

8. A baking pan for baking a product having two different consistencies, the baking pan comprising:
an open top hollow body configured to hold a material having an upper surface, the body having an upper edge defining a plane;
a bottom of the open top hollow body having a first flat bottom portion extending fully across the bottom parallel to the plane and spaced a first distance from the upper edge and a second flat bottom portion extending fully across the bottom parallel to the plane and spaced a second distance from the upper edge, the first and second flat bottom portions being unobstructed from each other; and
a transition portion between the first and second flat bottom portions;
wherein the baking pan is configured such that when the material is placed into the open top hollow body, the material has a first depth from the upper surface of the material over the first flat bottom portion and a second depth from the upper surface of the material over the second flat bottom portion different from the first depth of the material, and such that after baking the material in the baking pan, the material has different consistencies due to the difference in the first depth of the material from the upper surface of the material over the first flat bottom portion and the second depth of the material from the upper surface of the material over the second flat bottom portion.

9. The baking pan according to claim 8 wherein the transition portion is vertical.

10. The baking pan according to claim 8 wherein the transition portion is inclined from the first flat bottom portion to the second flat bottom portion.

11. The baking pan according to claim 8 wherein the open top hollow body defines a single compartment for placement of the material therein, the single compartment including the first flat bottom portion and the second flat bottom portion.

12. The baking pan according to claim 8 wherein the open top hollow body has four side walls, and wherein the four side walls each terminate at a bottom edge parallel to the plane defined by the upper edge.

13. A baking pan for baking a product having two different levels of doneness, the baking pan comprising:
an open top box shaped body having a closed upper edge defining a plane parallel to an upper surface of a material carried in the open top box shaped body during baking and a flat bottom parallel to the plane; and
a flat insert shaped to fit onto the flat bottom within the open top box shaped body and defining within the open top box shaped body a first portion of the flat bottom spaced adjacent the insert and a second portion, wherein the second portion is an upper surface of the insert adjacent the first portion of the flat bottom,
wherein the open top box shaped body defines a single compartment for placement of the material therein, the single compartment including the first portion and the second portion, the first and second portions being unobstructed from each other;
wherein the baking pan is configured such that when the material is placed into the single compartment defined by the open top box shaped body, the material has a first depth from the upper surface of the material over the first portion and a second depth from the upper surface of the material over the second portion different from the first depth of the material, and such that after baking the material in the baking pan, the material has different levels of doneness due to the difference in the first depth of the material from the upper surface of the material over the first portion and the second depth of the material from the upper surface of the material over the second portion.

14. The baking pan according to claim 13 further comprising the flat insert having a straight angled edge portion for transitioning to the first portion of the flat bottom of the body.

15. A baking pan comprising:
an open top body for holding a material, the body having an upper edge defining a plane substantially parallel to an upper surface of the material held within the open top body during baking;
a bottom of the body spaced from the upper edge having a first flat bottom portion at a first depth from the upper edge extending fully across a width of the bottom of the body, wherein the first flat bottom portion is parallel to the plane, and a second flat bottom portion extending fully across the width of the bottom of the body at a second depth from the upper edge different from the first depth, the first and second flat bottom portions being unobstructed from each other;
wherein the baking pan is configured such that when the material is placed into the open top body, the material has a first depth from the upper surface of the material over the first flat bottom portion and a second depth from the upper surface of the material over the second flat bottom portion different from the first depth of the material, and such that after baking the material in the baking pan, the material has different levels of consistencies due to the difference in the first depth of the material from the upper surface of the material over the first flat bottom portion and the second depth of the material from the upper surface of the material over the second flat bottom portion.

16. The baking pan according to claim 15 further comprising a transition portion between the first flat bottom portion and the second flat bottom portion.

17. The baking pan according to claim 16 wherein the transition portion is an inclined surface.

18. The baking pan according to claim 16 wherein the transition portion is vertical.

19. The baking pan according to claim 15 wherein a depth difference between the first depth and the second depth is between ¼ and ⅜ inches and/or the second flat bottom portion is parallel to the upper edge.

20. The baking pan according to claim 15 wherein the open top body defines a single compartment for placement of the material therein, the single compartment including the first flat bottom portion and the second flat bottom portion.

* * * * *